United States Patent [19]
Tagawa et al.

[11] 3,754,097
[45] Aug. 21, 1973

[54] COLOR TELEVISION CAMERA

[75] Inventors: Susumu Tagawa, Kamakura-shi, Kanagawa-ken; Yasuharu Kubota, Fujisawa-shi, Kanagawa-ken, both of Japan

[73] Assignee: Sony Corporation, Tokyo, Japan

[22] Filed: June 23, 1972

[21] Appl. No.: 265,517

[30] Foreign Application Priority Data

Nov. 17, 1971 Japan ............................... 46/92279

[52] U.S. Cl. ............................................ 178/5.4 ST
[51] Int. Cl. ............................................ H04r 9/06
[58] Field of Search ..................... 178/5.4 E, 5.4 ES, 178/5.4 ST, 5.4 TC

[56] References Cited

UNITED STATES PATENTS

| | | | |
|---|---|---|---|
| 3,688,020 | 8/1972 | Kubota et al. | 178/5.4 ST |
| 3,710,013 | 1/1973 | Kubota et al. | 178/5.4 ST |
| 3,688,023 | 8/1972 | Kubota et al. | 178/5.4 ST |

*Primary Examiner*—Richard Murray
*Assistant Examiner*—Fay Konzem
*Attorney*—Lewis H. Eslinger et al.

[57] ABSTRACT

A color television camera utilizing a vidicon tube that has a filter in the form of alternate stripes for the primary colors red, green and blue, a pair of electrodes for each set of three stripes and a photoconductive layer. An alternating voltage produced by a DC-DC converter is applied to the electrodes to provide a predetermined pattern on the surface of the photoconductive layer with the image to be reproduced. The composite signal on the photoconductive layer of an index signal and a color video signal is fed back through the same terminals that applied the alternating voltage to the electrodes to a circuit which separates the color video signal from the index signal. The index signal is then applied to three demodulators to obtain the color video signals. The circuit which separates the index and chrominance signals operates under the control of an output signal from the DC-DC converter which also supplies the alternating voltage to the electrodes.

9 Claims, 16 Drawing Figures

Patented Aug. 21, 1973 3,754,097

4 Sheets-Sheet 3

COLOR TELEVISION CAMERA

BACKGROUND OF THE INVENTION

This invention relates to a device for reproducing a color video signal by the employment of a single image pickup tube, and more particularly to a color video signal reproducing device having a simplified index signal generating circuit.

A pickup tube of the type having a target and a multiplicity of color filters and signal plates extending transversely of the direction of line scan has been disclosed in U.S. Pat. No. 2,446,249. In this type of pickup tube the signal plates corresponding to the color filters are connected to bus bars and the respective primary color video signals are derived from three signal output terminals connected to the bus bars. However, this pickup tube is defective in that each primary color video signal is mixed with other primary color video signals due to the electrostatic capacity coupling present between the respective signal electrodes. This results in crosstalk which lowers the color purity of the color video signal.

There has also been proposed a system such as disclosed in U.S. Pat. No. 3,502,799 in which a plurality of index signal images and striped color component images are optically formed on the target of a vidicon tube to produce a composite color video signal with an index. With this system, however, the ratio between the color component image area and the effective scanning area of the vidicon is decreased by an amount corresponding to the index signal images. This results in lower resolution. Further, this prior art system necessitates a complicated and expensive device for optically forming the index signal images on the target.

A color television camera which overcomes these disadvantages is disclosed in detail in U.S. Patent Application No. 72,593, filed Sept. 16, 1970 by Yasuharu Kobota, one of the present joint inventors, and having a common assignee herewith. As disclosed in that application the camera employs a vidicon tube that has a filter in the form of alternate stripes for the primary colors red, green and blue, a pair of electrodes for each set of three stripes and a photoconductive layer. An alternating voltage is applied to the electrodes to provide a predetermined pattern on the surface of the photoconductive layer in the form of an index signal which is overlapped on the photoconductive layer with the image to be reproduced. The composite signal on the photoconductive layer of an index signal and a color video signal is fed through the same terminals that applied the alternating voltage to the electrodes to a circuit which separates the color video signal from the index signal. The index signal is then applied to three demodulators to obtain the color video signals.

There are several disadvanages with much a camera as disclosed in U.S. Application Ser. No. 72,593. One such disadvantage is that a phase inverter circuit, which is included in the circuit which separates the index and chrominance signals from the composite signal, is controlled by a separate oscillator which must be synchronized with the oscillator which produces the alternating voltage applied to the electrodes. Another disadvantage is that unless the phase inverter oscillator produces a large magnitude switching signal the switching (ie. phase inversion) of the inverter is not of a high quality. Still another disadvantage is that the alternating signal source commonly has a high output impedance which, because of the relatively large stray capacity of the electrodes (on the order of a few hundred picofarads), prevents the alternating signal from having a completely rectangular waveform.

SUMMARY OF THE INVENTION

The above and other disadvantages are overcome by the present invention which employs a pickup tube of the type having a plurality of electrodes, a color filter and a photoconductive surface and is adapted to form color separated images on the photoconductive layer. An alternating voltage synchronized with the line scanning period of the pickup tube is supplied to the plurality of electrodes by a DC-DC converter to form a predetermined pattern of voltage potential changes on the surface of the photoconductive layer of the pickup tube. This pattern of potential changes is reproduced as an index signal.

The index signal is produced by the pickup tube as part of a composite signal which also includes a luminance signal and a chrominance signal. A set of color difference signals representing the difference between the luminance signal and at least two of the primary color video signals is derived from the composite signal by a demodulator circuit and accordingly a color video signal of good white balance is thereafter obtained.

The demodulator circuit includes a circuit for inverting the phase of the index signal during alternate scanning periods. The phase inversion circuit operates under the control of the same DC-DC converter which also supplies the alternating voltage to the electrodes and thus the phase inverter does not require a separate oscillator.

The control signal supplied from the DC-DC converter is synchronous with the alternating voltage supplied to the electrodes and has a high magnitude, thereby producing high quality phase inversion of the index signal during alternate scanning periods. Another advantage of the circuit of the present invention is that the DC-DC converter has a low output impedance and therefore the quality of the waveform of the alternating voltage is unaffected by the stray capacity of the electrodes.

It is therefore an object of the invention to provide an improved color television camera which has a simplified circuit construction.

It is another object of the invention to provide an improved color television camera having a single source for generating an alternating voltage to be applied to the camera's pickup tube electrodes and for controlling the phase inversion of the index signal.

It is still another object of the invention to provide such a camera wherein the single alternating voltage source has a high output impedance.

These and other objectives, features, and advantages of the invention will be more readily understood upon consideration of the following detailed description of certain preferred embodiments of the invention taken in conjunction with the accompanying drawings.

DESCRIPTION OF CERTAIN PREFERRED EMBODIMENTS

Figure 1:
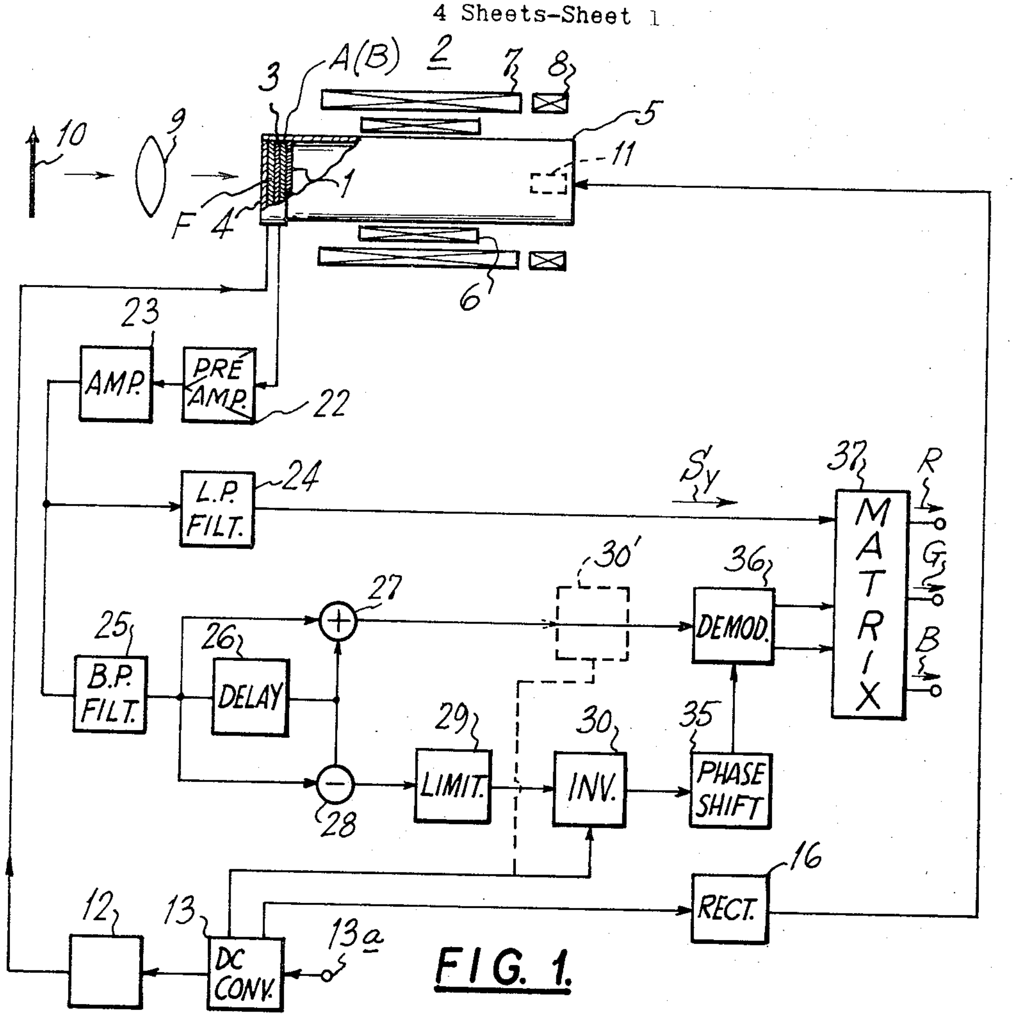
FIG. 1 is a system diagram illustrating one example of a color television camera in accordance with the present invention.
Figure 2:
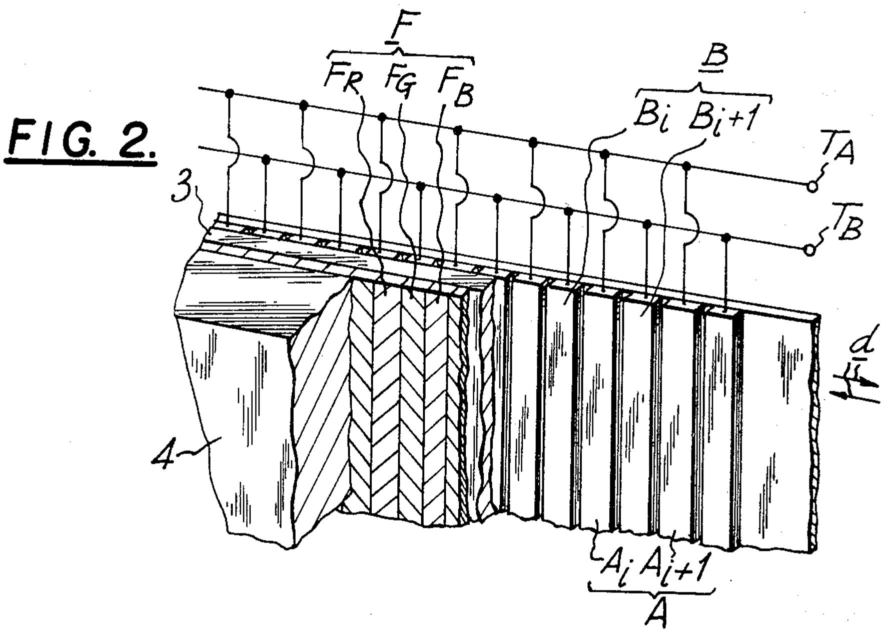
FIG. 2 is a perspective view partly in cross-section and showing the principal parts of the pickup tube employed in the color television camera illustrated in FIG. 1.

FIG. 1 illustrates a camera system suitable for use with this invention. In FIGS. 1 and 2 two sets of electrodes A ($A_1, A_2, \ldots A_i, \ldots A_n$) and B ($B_1, B_2, \ldots B_i, \ldots B_n$) are disposed adjacent the photoconductive layer 1 of a pickup tube 2. The photoconductive layer 1 is formed for example, of materials such as antimony trisulfide, lead oxide etc. The electrodes A and B are transparent conductive layers formed of tin oxide including antimony and they are alternately arranged in an order which may for example be $A_1, B_1, A_2, B_2, \ldots A_i, B_i, \ldots A_n, B_n$, the electrodes being respectively connected to terminals $T_A$ and $T_B$ (FIG. 4) for connection with external circuits. In this case, the electrodes are disposed so that their longitudinal directions may cross the horizontal scanning direction of an electron beam.

The electrodes A and B are disposed on one side of a glass plate 3, on the other side of which an optical filter F made up of red, green and blue color filter elements $F_R$, $F_G$ and $F_B$ arranged in a repeating cyclic order of $F_R, F_G, F_B, F_R, F_G, F_B, \ldots$ are disposed parallel to the length of the electrodes A and B in such a manner that each triad of red, green and blue color filter elements $F_R$, $F_G$ and $F_B$ may be opposite to each pair of adjacent electrodes $A_i$ and $B_i$. So long as the electrodes A and B and the optical filter F are aligned with each other in their longitudinal directions, their relative arrangement is optional. The optical filter F is fixed to the faceplate 4.

The pickup tube 2 has enclosed therein the photoconductive layer 1, the electrodes A and B, the glass plate 3, the optical filter F and the faceplate 4 mounted on one end of the tube envelope 5. About the image pickup tube 2 there are mounted a deflection coil 6, a focusing coil 7 and an alignment coil 8. Reference numeral 9 indicates an image lens, by means of which the images of an object 10 to be televised is focused onto the photoconductive layer 1 thorugh the faceplate 4. Reference numeral 11 designates an electron gun for emitting an electron beam.

Figure 3A:
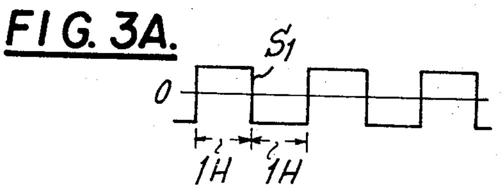
FIGS. 3A and 3B are waveform diagrams, for explaining the invention.
Figure 4:
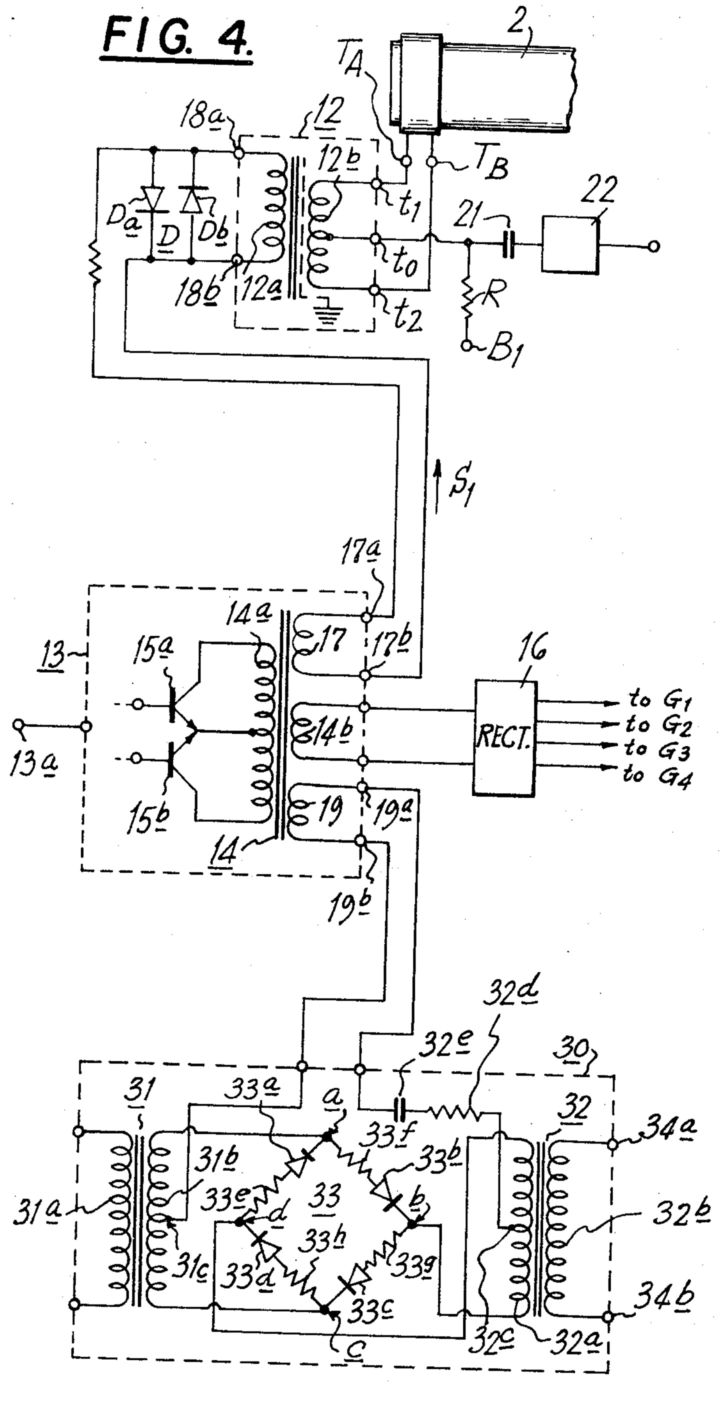
FIG. 4 is a schematic diagram of the DC-DC converter circuit and the phase inverter circuit of one embodiment of this invention.

Referring now more particularly to FIG. 4, an alternating signal $S_1$ is supplied to the electrodes A and B from a DC converter 13 through a transformer 12. This alternating signal $S_1$ has a rectangular waveform such as that illustrated in FIG. 3A with a pulse width equal to a horizontal scanning period H of the electron beam, namely a pulse width of, for example, 63.5 microseconds and a frequency which is one-half of the horizontal scanning frequency, namely 15.75/2 KHz. The transformer 12 has a primary winding 12a and a secondary winding 12b which has a mid tap $t_o$ and a pair of terminals $t_1$ and $t_2$ which are respectively connected to the terminals $T_A$ and $T_B$ of the image pickup tube 2. As will be described in further detail below, the leads of the primary winding 12a are connected at the terminals 18a and 18b to the DC-DC converter through a diode wave shaping circuit D.

The DC converter 13 has an input terminal 13a and includes an oscillating transformer 14. The DC-DC converter is not shown in detail as such circuits are well known to those skilled in the art. (See for example, Texas Instruments Incorporated, Transistor Circuit Design, pp. 433–446 (International Student Edition 1963)). The oscillating transformer 14 has a primary winding 14a connected to a pair of driving transistors 15a and 15b and a secondary winding 14b connected through a rectifier circuit 16 to a plurality of grids, for example $G_1$–$G_4$, in the pickup tube 2. The transformer 14 includes a third winding 17 having a pair of terminals 17a and 17b which are connected to the terminals 18a and 18b, respectively, of the primary winding 12a of the transformer 12.

The DC converter 13 is driven with a low voltage, horizontal driving signal which is supplied to the input terminal 13a. An intermediate amplifier, not shown, converts this input signal into driving signals which are applied to the base electrodes of transistors 15a and 15b. The signals derived from the secondary winding of the transformer 14 are synchronous with the horizontal scanning period of the pickup tube 2. Further, since the DC converter 13 is driven in a saturated condition, the value of the impedance in the third winding 17 can be selected to be very low, for example a few ohms or even less than one ohm.

Figure 3B:
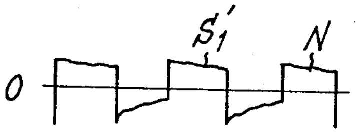

As shown in FIG. 4, a pair of diodes Da and Db are connected in parallel, but with opposite polarity, between the terminals 18a and 18b. Together, the diodes Da and Db constitute a waveform correction circuit D. If, for example, the waveform of the alternating signal $S_1$ is deformed at its negative cycle, as illustrated in FIG. 3B, the circuit D corrects the waveform to be completely symmetrical as shown FIG. 3A. Reference letter N designates electronic noise in FIG. 3B. Without such correction the deformed alternating signal would cause the amount of the off-set of the video signal carrier to be varied with each horizontal scanning period.

The midpoint $t_o$ of the secondary winding 12b of the transformer 12 is connected to the input of a preamplifier 22 through a capacitor 21 and is supplied with a DC bias voltage of 10 to 50V from a power source B+ through a resistor R.

Figures 5A, 5B, 5C, 5D, 5E, 5F:
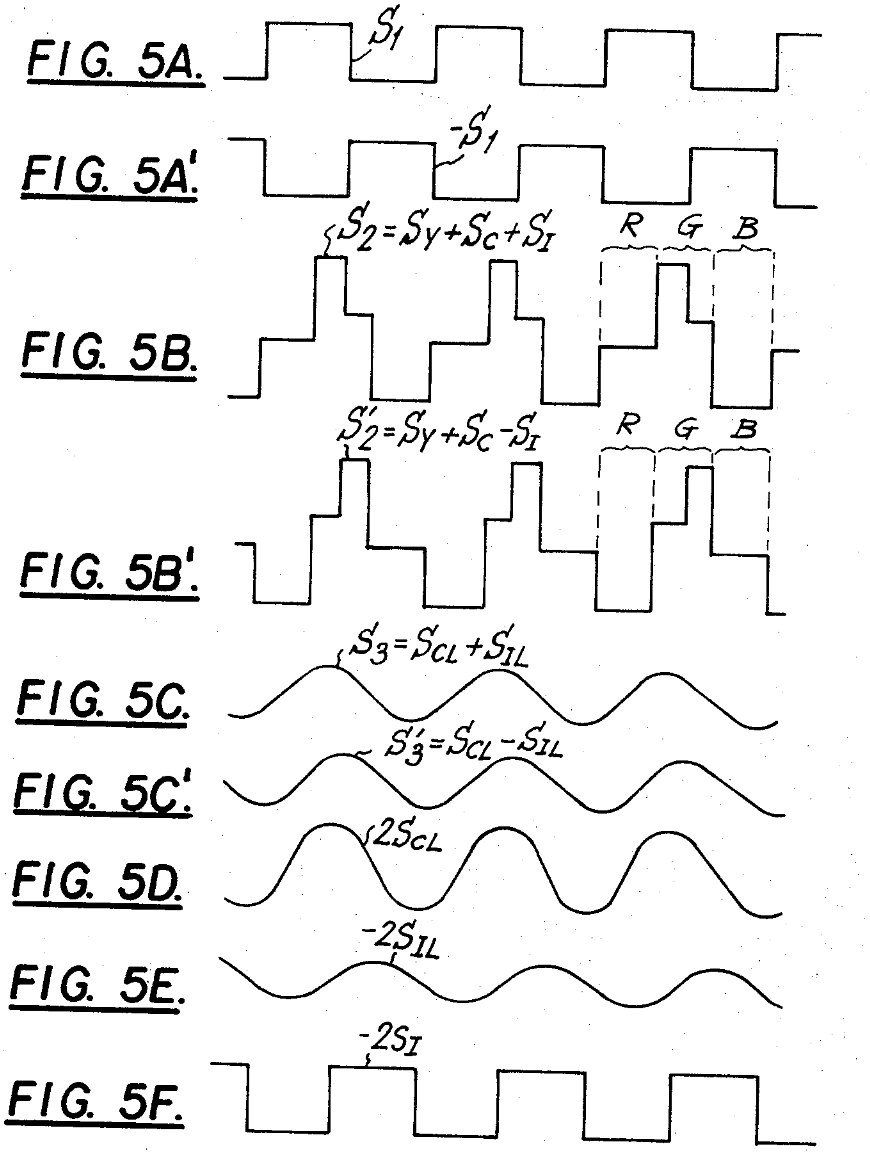
FIGS. 5A, 5A', 5B, 5B', 5C, 5C', 5D, 5E, 5F, are waveform diagrams, for use in explaining the invention.

With such an arrangement, the electrodes A and B are alternately supplied with voltages higher and lower than the DC bias voltage with succeeding horizontal scanning periods, so that a striped potential pattern corresponding to the electrodes A and B is formed on the surface of the photoconductive layer 1. Accordingly, when the image pickup tube 2 is not exposed to light, a signal corresponding to the rectangular waveform illustrated in FIG. 5A is derived at the midpoint $t_o$ of the secondary winding 12b due to electron beam scanning in a period H*i*. When a DC bias voltage of, for example 30V is supplied to the midpoint $t_o$ of the secondary winding 12b and an alternating voltage of 0.5V is impressed between the terminals $T_A$ and $T_B$, a current flowing across the resistor R varies by 0.05 microamperes, which can be used as an index signal. The frequency of this index signal $S_I$ is optionally determined with reference to the width and interval of the electrodes A and B and one horizontal scanning period of the electron beam, and can for example be 4.5 MHz.

When the image of the object 10 is focused on the photoconductive layer 1, signals corresponding to the light intensity of the filtered red, green and blue components are produced on the photoconductive layer 1 in overlapping relation with the index signal $S_I$ to produce a composite signal $S_2$ such as is illustrated in FIG. 5B, in which the reference characters R, G and B respectively designate portions of the composite signal $S_2$ corresponding to the red, green and blue color components. The composite signal $S_2$ is the sum of the luminance signal $S_Y$, the chrominance signal $S_C$ and the index signal $S_I$, namely $S_2=S_Y+S_C+S_I$.

Figure 6:
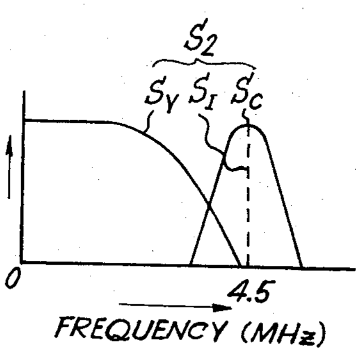
FIG. 6 is a graph showing one example of a frequency spectrum for a color video signal produced by the color television camera of this invention.

The frequency spectrum of the composite signal $S_2$, as illustrated in FIG. 6, is determined by the width of the electrodes A and B, the width of the optical filter F and the horizontal scanning period. That is, the composite signal $S_2$ in its entirety is in a bandwidth of 6MHz and the luminance and chrominance signals $S_Y$ and $S_C$ are respectively arranged in the lower and higher bands. It is preferred to minimize overlapping of the luminance and chrominance signals $S_Y$ and $S_C$ and, if desired, it is possible to position a lenticular lens or the like in front of the image pickup tube 2. This optically lowers resolution and narrows the luminance signal band.

In the next horizontal scanning period $H_{i+1}$ the alternating signal applied to the electrodes A and B is reversed in phase, in which case an index signal $-S_I$ is produced such as depicted in FIG. 5A' which is opposite in phase to the index signal $S_I$ shown in FIG. 5A. Accordingly, a composite signal $S_2'=S_Y+S_C-S_I$ as shown in FIG. 5B' is derived at the input side of the pre-amplifier 22.

Such a composite signal $S_2$ (or $S_2'$) is first supplied to the pre-amplifier 22 to be amplified and is then supplied to a process amplifier 23 for waveform shaping and gamma correction. Thereafter the signal is applied to both a low-pass filter 24 and a bandpass filter 25. A luminance signal $S_Y$ is separated from the composite signal by the low-pass filter 24 and a signal $S_3=S_{CL}+S_{IL}$ such as shown in FIG. 5C (or a signal $S_3'=S_{CL}+S_{IL}$ such as depicted in FIG. 5C') is separated from the composite signal by the bandpass filter 25. The terms $S_{CL}$ and $S_{IL}$ are the low frequency components or fundamental components of the chrominance signal $S_L$ and the index signal $S_I$, respectively.

The separation of the index signal $S_I$ and the chrominance signal $S_C$ will hereinbelow be described. Since the repetitive frequencies of the index signal $S_I$ and the chrominance signal $S_C$ are equal to each other, the separation of these signals is achieved in the following manner without using a filter.

Reference numeral 26 indicates a delay circuit, such as an ultrasonic delay line for example, by means of which the signal $S_3=S_{CL}+S_{IL}$ (or $S_3'=S_{CL}-S_{IL}$) derived from the bandpass filter 25 is delayed by one horizontal scanning period 1H. Reference numeral 27 designates an adder circuit and 28 a subtraction circuit. The signal $S_3=S_{CL}+S_{IL}$ (or $S_3'=S_{CL}-S_{IL}$) delayed from a certain horizontal scanning period $H_i$ by the delay circuit 26 is added to the signal $S_3'=S_{CL}-S_{IL}$ (or $S_3=S_{CL}+S_{IL}$ ) from the subsequent horizontal scanning period $H_{i+1}$ in the adder circuit 27. The output of the adder circuit 27 is a chrominance signal $2S_{CL}$ such as depicted in FIG. 5D. In this case, the content of the chrominance signals in adjacent horizontal scanning periods are so similar that they can be regarded as substantially the same. It is even possible to delay the signals from the bandpass filter 25 by three or five horizontal scanning periods due to their similarity.

These signals $S_3=S_{CL}+S_{IL}$ (or $S_3'=S_{CL}-S_{IL}$) and $S_3'=S_{CL}-S_{IL}$ (or $S_3=S_{CL}+S_{IL}$) in the horizontal scanning periods $H_i$ and $H_{i+1}$ are applied to the subtraction circuit 28 to achieve a subtraction $(S_{CL}-S_{IL})-(S_{CL}+S_{IL})$ [or $(S_{CL}+S_{IL})-(S_{CL}-S_{IL})$] and thereby produce an index signal $-2S'_{IL}$ (or $2S'_{IL}$, though not shown) such as depicted in FIG. 5E. The resulting index signal $-2S'_{IL}$ (or $2S_{IL}$) is fed to a limiter circuit 29 to render a uniform amplitude index signal $-2S_I$ (or $2S_I$) as depicted in FIG. 5F.

The index signal $-2S_I$ thus obtained must be reversed in phase to become $2S_I$ in alternate horizontal scanning periods. To accomplish this the index signal $-2S_I$ (or $2S_I$) is supplied to a phase inverter 30. The phase inverter 30 is controlled with an output signal from the DC converter 13. As shown in FIG. 4, the phase inverter 30 is in the form of a circuit commonly called a ring modulator and comprises an input transformer 31 and an output transformer 32 with a diode bridge circuit 33 connected between the input and output transformers 31 and 32. The index signal $-2S_I$ (or $2S_I$) is supplied to a primary winding **31*a* of the input transformer 31 so that an output signal will appear on a secondary winding 32*b* of the output transformer 32**.

The bridge has four diodes **33*a*, 33*b*, 33*c*, and 33*d* arranged in series in the same conductive direction. The cathode of the diode 33*a*** is connected to a terminal *a* which is also connected to one lead of the secondary winding **31*b* of the transformer 31. The anode of the diode 33*b*** is connected to the terminal *a* through a resistor **33*f*. The cathode of the diode 33*b*** is connected to a terminal *b* which is connected to one lead of the primary winding **32*a* of the transformer 32. The anode of the diode 33*c*** is connected to the terminal *b* through a resistor **33*g* and the cathode of diode 33*c*** is connected to a terminal *c*. The terminal *c* is connected to the other lead of a secondary winding **31*b* and is also connected to the anode of the diode 33*d* through a resistor 33*h*. The cathode of the diode 33*d*** is connected to a terminal *d* which is connected to the other lead of the primary winding **32*a***. The terminal *d* is also connected to the anode of the diode **33*a* through a resistor 33*e***.

The mid tap **31*c* of the secondary winding 31*b* is connected to one lead of an auxiliary winding 19 of the oscillating transformer 14 of the DC converter 13 through a terminal 19*b*. The mid tap 32*c* of the primary winding 32*a* is connected in series with a resistor 32*d* and a capacitor 32*e* to a terminal 19*a* which is also connected to the other lead of transformer winding 19**.

A signal which is synchronous with the horizontal scanning period appears on the winding 19 of the oscillating transformer 14 of the DC converter 13. This signal is synchronous with the alternating signal $S_I$ and acts as a switching signal. This switching signal has a rectangular waveform which provides a rising edge at every horizontal scanning period. Since the switching signal is supplied to bias the diodes through the mid taps **31*c* and 32*c* of the respective transformers 31 and 32, it will be understood that the index signal $-2S_I$ (or $2S_I$) supplied to the primary winding 31*a* of the input transformer 31 is switched with the switching signal and is limited in its amplitude by the diode bridge circuit 33 so that the corrected, in phase index signal, namely $2S_I$ appears between the terminals 34***a* and 34*b* of the output transformer 32. The operation of such ring modulators is well understood by those skilled in the art and is therefore not described in detail. (See for example, Texas Instruments Incorporated, Transistor Circuit Design, pp. 168–173 (International Student Edition 1963)).

Referring again more particularly to FIG. 1, the index signal defined as $2S_I$ derived from the output of the phase inverter 30 is next supplied to a chrominance signal demodulater 36 through a phase shifter 35 which adjusts the phase of the index signal. The chrominance signal $2S_{cL}$ is also supplied to the demodulator 36 from the adder 27 and three color difference signals, namely $S_R$–$S_Y$, $S_B$–$S_Y$ and $S_G$–$S_Y$ are produced in the demodulator 36. These color difference signals and the luminance signal $S_Y$ derived from the low pass filter 24 are supplied to a matrix circuit 37 to provide the primary color video signals R, G and B at separate terminals. The color signals thus obtained may be suitable processed to produce color television signals for NTSC system and other various systems.

Figure 7:
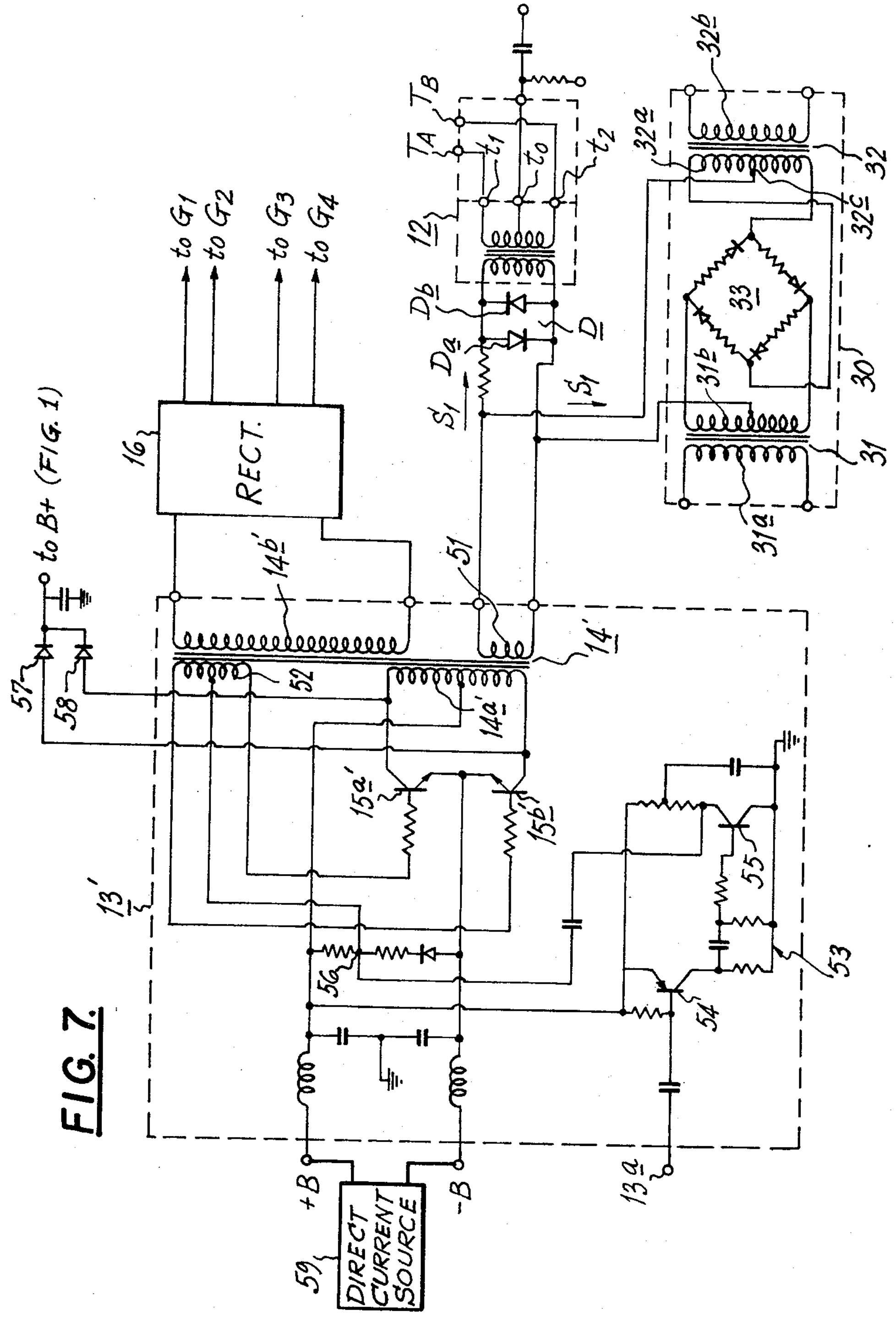
FIG. 7 is a schematic diagram of a modification of the embodiment of FIG. 4.

A modified circuit according to the invention is diagrammatically illustrated in FIG. 7. In the description of this embodiment reference numerals corresponding to those used in the description of the embodiment of FIG. 4 are utilized. The modified DC converter 13′ includes a transformer 14′ having a center tapped primary winding 14*a′* driven by a pair of transistors 15*a′* and 15*b′* and a secondary winding 14*b′* connected to the rectifier circuit 16.

The input signal from the terminal 13*a′* is connected to a transistor amplifier generally designated 53 which includes PNP transistors 54 and 55 and is connected to a terminal point 56. The terminal 56 is connected to the mid tap of a winding 52 of the transformer 14′. The outer leads of the winding 52 are separately connected through resistors to the base electrodes of transistors 15*a′* and 15*b′*. A source of positive direct current is connected through a pair of diodes 57 and 58 to the outer leads of the winding 14*a′* of the transistor 14′.

The diodes 57 and 58 are oriented so that their anodes are connected to the outer leads of transformer winding 14*a′*. The collector electrode of the transistor 15*a′* is connected to one of the outer leads of the a′ and the collector electrode of the transistor 15*b′* is connected to the other outer lead of the winding 14*a′*. The center tap of the winding 14*a′* is connected to a positive terminal of a direct current source 59. The negative terminal of the direct current source 59 is connected to the emitter electrodes of the transistors 15*a′* and 15*b′*.

In operation, assuming the transistor 15*a′* is conducting, direct current flows through the winding 14*a′* to induce a voltage in the winding 52. As the core of the transformer 14′ approaches saturation, the voltage induced in the winding 52 is reduced and the transistor 15*a′* is turned off and the transistor 15*b′* is turned on.

On the other hand, when the amplified signal applied to the terminal 13*a* appears at the terminal 56 the potential at the mid tap of the transformer winding 52 increases so that the base electrode of the transistor 15*b′* increases and the transistor 15*b′* is turned on while the transistor 15*a′* is turned off. This change of current through the winding 14*a′* is inductivity conveyed to the winding 52 to repeat the cycle. Thus the conductive timing of the transistor 15*b′* is controlled by the signal applied to the terminal 13*a*.

The two portions of the winding 14*a′* provide opposite polarities and so a half frequency of the signal applied to the terminal 13*a* appears on an auxiliary winding 51 of the transformer 14′.

This alternating signal $S_1$ produced in an auxiliary winding 51 is fed to the primary winding of the transformer 12 through the diode circuit D and to the mid taps 31*c* and 32*c* of the transformers 31 and 32, respectively, of the phase inverter 30. According to this embodiment the transformer winding 17 illustrated in the embodiment of FIG. 4 is eliminated so that the DC-DC converter circuit is simplified.

In still another embodiment illustrated in FIG. 1 in hidden line fashion, it is possible to provide a phase inverter 30′ in the chrominance signal transmitting line, namely between the adder circuit 27 and the demodulator 36, in place of the phase inverter 30 in the index signal transmitting lines. As in the above embodiments the phase inverter 30′ is also controlled with the switching signal derived from the DC converter 13.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

What is claimed is:

1. A color television camera for generating an electrical signal corresponding to an object in the field of view of the camera, the camera comprising a scanning surface adapted to convert light projected thereon into an electrical output, filter means disposed between the object and the scanning surface and adapted to form on the scanning surface a color separated image in accordance with the color components of the object, means for scanning the scanning surface, and a DC-DC converter responsive to the scanning means for supplying an alternating signal to the indexing electrodes to electrically form an index image on the scanning surface, the index image having a phase that changes alternately in successive periods of the output so that the electrical output is a composite signal containing a color video signal corresponding to the color separated image and an index signal corresponding to the index image and having its phase similarly changed in the successive periods.

2. A color television camera comprising image pickup means having a photoconductive surface for the photoelectric conversion of images projected thereon into an electrical output, filter means disposed between the surface and an object to be reproduced for forming a color separated image of the object on the surface, index electrodes disposed in close proximity to the surface, first circuit means connected with the index electrodes and including a DC-DC converter for electrically forming on the surface an index image having a phase that changes alternately in successive periods of the output so that the electrical output is a composite signal containing a color video signal corresponding to the color separated image and an index signal corresponding to the index image, at least one delay circuit means for delaying the composite signal by one of the periods, adding circuit means for adding the output of the delay circuit means and the composite signal to produce the color video signal as an output from the adding circuit means, subtracting circuit means receiving the composite signal and the output of the delay circuit means to produce the index signal as the difference therebetween, and means controlled by the index signal for separating individual color component signals from the color video signal.

3. A color television camera comprising a surface scanned by an electron beam for converting light projected on the surface into an electrical output, filter mean disposed between an object in the field of view of the camera and the surface for forming on the surface a color separated image of the object made up of image elements corresponding to the color components of respective elements of the object, a pair of index electrodes for each of the image elements and which are disposed in close proximity to the surface, and circuit means, including a DC-DC converter, for applying different electrical potentials to the index electrodes of each pair thereof for electrically forming an index image on the surface and reversing the different electrical potentials in successive periods of the electrical output so that the electrical output is a composite signal containing a color video signal corresponding to said color separated image and an index signal corresponding to said index image and means responsive to the DC-DC converter for reversing the phase of the index signal in successive periods.

4. A color television camera as recited in claim 3 wherein the DC-DC converter includes an oscillating transformer having an auxiliary winding and means for connecting the auxiliary winding to the index signal phase reversing means.

5. A color television camera as recited in claim 4, wherein the phase reversing means includes a limiting circuit.

6. A color television camera as recited in claim 4, wherein the phase reversing means comprises an input transformer to be supplied with one of components of the composite signal, an output transformer and a diode bridge circuit connected between the input and output transformers.

7. A color television camera as recited in claim 6, wherein a switching signal is derived from the auxiliary winding of the oscillating transformer and is supplied by the connecting means to the input and output transformers.

8. A color television camera as recited in claim 4, wherein the oscillating transformer further includes a second auxiliary winding and means for connecting the second auxiliary winding to the indexing electrodes.

9. A color television camera as recited in claim 4, comprising means for supplying the switching signal to the first circuit means.

* * * * *